United States Patent [19]

Bergman et al.

[11] Patent Number: 4,684,031

[45] Date of Patent: Aug. 4, 1987

[54] MATERIAL HOISTING GIN

[75] Inventors: Frederick S. Bergman, #12685 - 82nd Avenue, Surrey, British Columbia, Canada, V3W 3G2; Reginald P. Radelet, Maple Ridge, Canada

[73] Assignee: Frederick Sigurdur Bergman, Calgary, Canada

[21] Appl. No.: 755,317

[22] Filed: Jul. 15, 1985

[51] Int. Cl.⁴ .............................................. B66C 23/18
[52] U.S. Cl. ................................... 212/179; 212/245; 212/251
[58] Field of Search ............... 212/175, 179, 223, 245, 212/251; 254/134.3 PA

[56] References Cited

U.S. PATENT DOCUMENTS

| | | | |
|---|---|---|---|
| 839,479 | 12/1906 | Howe | 212/244 |
| 1,319,964 | 10/1919 | Morgan | 212/179 |
| 1,432,561 | 10/1922 | Johnson | 248/231 |
| 1,540,630 | 6/1925 | Jenks et al. | 212/223 |
| 2,252,001 | 8/1941 | Gullberg | 254/134.3 PA |
| 2,625,371 | 1/1953 | Dunn | 254/139 |
| 2,833,423 | 5/1958 | Tucker | 212/179 |
| 3,064,824 | 11/1962 | Beatty | 212/179 |
| 3,559,941 | 2/1971 | Holzman | 248/231 |
| 3,647,171 | 3/1972 | Rafferty | 248/231 |
| 4,010,971 | 3/1977 | Kuwamoto et al. | 294/81.2 |
| 4,482,289 | 11/1984 | Inaba et al. | 294/81.2 |

FOREIGN PATENT DOCUMENTS 1033512 7/1953 France ............................ 212/179

OTHER PUBLICATIONS

Transformer Gin, A. B. Chance, Canada, pp. 3C-2, 3B-16, 3B-10, 9/1/80.
Transformer Gin, Safety Line, Oakland, Calif., Section B, p. 1, 7/1/78.
Transformer Gin, Kearney-National, Guelph, Canada, Section 18, 6/30/71.
Transformer Gin, Kearney National, p. 28, 4/69.

Primary Examiner—Joseph F. Peters, Jr.
Assistant Examiner—Stephen P. Avila
Attorney, Agent, or Firm—Chernoff, Vilhauer, McClung & Stenzel

[57] ABSTRACT

A material hoisting gin has a support beam which pivots atop a mounting bracket which may be releasably attached to an upright pole. A bar for supportably engaging a load is suspended from the beam in a manner which enables the bar to be raised so that it is closely proximate to the base of the beam. This arrangement enables the gin to be mounted with the beam very close to the top of the load (which is to be raised or lowered with respect to the pole). The gin can thus be used in situations where there is minimal operating clearance above the load. In particular, the gin can frequently be used to raise or lower distribution transformers on utility poles without encroaching upon the limits of approach to the overhead power lines.

2 Claims, 3 Drawing Figures

MATERIAL HOISTING GIN

FIELD OF THE INVENTION

This application pertains to material hoisting gins, particularly transformer gins for raising or lowering distribution transformers with respect to utility poles.

BACKGROUND OF THE INVENTION

Transformer gins are devices which may be attached to a utility pole to facilitate raising or lowering of electrical distribution transformers with respect to the pole. Such transformers, which usually weigh about 300 to 850 pounds, are typically mounted near the top of the pole between the primary and secondary voltage power lines supported by the pole. Conventional transformer gins include a supporting arrangement which must be releasably attached to the pole above the transformer and a hoist such as a block and tackle rig or a sling which is suspended from the support to carry the weight of the transformer as it is raised or lowered with respect to the pole with the aid of a power operated winch.

The authorities responsible for ensuring safe working conditions for high voltage linemen have established "limits of approach" which are the minimum distances to which qualified personnel may approach live electrical lines and/or apparatus in the absence of approved protective equipment barriers and/or devices. For example, qualified employees of the British Columbia Hydro and Power Authority may approach 12,000 volt conductors and/or apparatus to within no more than 0.9 meters when working with uninsulated aerial lifting equipment or the like. Such employees may approach 25,000 volt conductors to within no more than 1.2 meters when working under such conditions. However, the mounting distance between a distribution transformer and the overhead primary voltage power lines is typically such that conventional transformer gins cannot be used without encroaching upon the aforementioned limits of approach. Frequently, for example, the gin supporting arms protrude upwardly from their point of attachment to the utility pole to provide sufficient clearance for the block and tackle or other hoist means from which the transformer is suspended. This can clearly be seen, for example, in FIG. 1 of U.S. Pat. No. 2,833,423 granted May, 6 1958 for an invention of J. A. Tucker.

In many practical situations the distance between the top of the distribution transformer and the overhead primary voltage power lines will be such that devices of the type exemplified in the Tucker patent cannot be used without encroaching upon the aforementioned limits of approach. Accordingly, such devices can frequently only be used by following a rigorous safety procedure which requires the cooperation of the utility authorities (who would, for example, deactivate any circuit reclosing devices in the electrical circuit which includes the particular distribution transformer), the presence of at least two qualified linemen and the use of special protective equipment. This increases the cost and time required to install, remove or replace a distribution transformer which, by itself, is a relatively simple task.

The present invention provides a material hoisting gin which is particularly well suited to use as a transformer gin. More specifically, the invention provides a transformer gin which requires only minimal operating clearance above the distribution transformer; thereby maximizing the likelihood that the gin may be used without encroaching upon the limits of approach to the overhead power lines. Furthermore, the gin is light in weight and can be used quickly, safely and effectively by a single man.

SUMMARY OF THE INVENTION

In accordance with the preferred embodiment, the invention provides a material hoisting gin comprising a mounting bracket, releasable attaching means for releasably attaching the bracket to an upright pole, an unbraced support beam atop the bracket for extending transversely to the longitudinal axis of the pole, a bar suspendable from the beam such that the bar may be raised so that it is closely proximate to the base of the beam, engaging means on the bar for supportably engaging a load such as a distribution transformer, and lifting means such as a rope or cable cooperating with the beam and bar for raising or lowering the load with respect to the pole. Preferably, the beam is pivotally mountable atop the bracket such that the beam may pivot in a plane transverse to the longitudinal axis of the pole. Advantageously, the beam may be mounted in any one of a range of positions, thereby facilitating selectable positioning of the ends of the beam with respect to the load and the pole.

The engaging means may be adjustable to accomodate loads of varying widths and to enable tightening of the bar on to the load. In particular, the engaging means may comprise a pair of support brackets suspended from opposed ends of the bar and slidably positionable with respect to the ends.

DETAILED DESCRIPTION OF THE DRAWINGS

DETAILED DESCRIPTION OF THE PREFERRED EMBODIMENT

Figure 1:
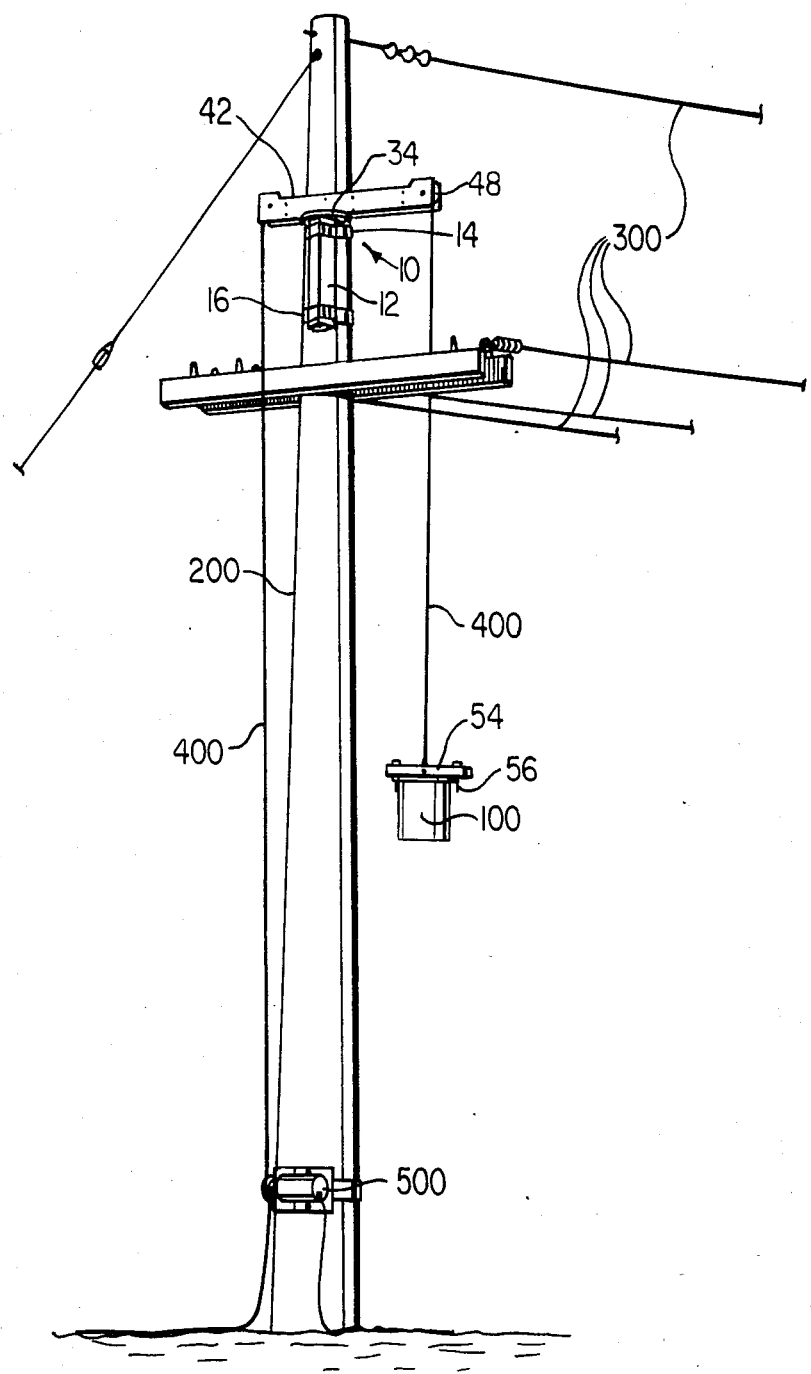
FIG. 1 is a pictorial illustration of the preferred embodiment operating as a transformer gin for raising or lowering a distribution transformer with respect to a utility pole.

The preferred embodiment herein described is a transformer gin 10 for raising or lowering a distribution transformer 100 with respect to a utility pole 200 from which one or more power lines 300 are suspended. It is to be understood however that the invention is of general application and may be used for hoisting loads other than transformers, and is especially well suited to use in situations where there is little clearance available for mounting gin 10 above the load.

Gin 10 includes an angled aluminum mounting bracket 12 which is releasably attached to pole 200 with straps 14, 16 and cooperating ratchet mechanisms 18, 20. The ends of straps 14, 16 are fed, respectively, into ratchet mechanisms 18, 20 for subsequent tightening as hereinafter described. Hooks 22, 24 are provided on the free ends of straps 14, 16. Bracket 12 is held against pole 200 and the pole is encircled with straps 14, 16. Hook 22 is engaged with pin 26 which is rigidly fastened to bracket 12. Hook 24 is engaged with slot 28 cut into the base of bracket 12. Bracket 12 is then tightened onto pole 200 with the aid of ratchet mechanisms 18, 20 to draw straps 14, 16 and bracket 12 firmly against pole 200 (this may be accomplished by using a wrench to turn bolts 30, 32 of ratchet mechanisms 18, 20). Preferably, a toothed flange 33 is provided within bracket 12 to bite into pole 200 as bracket 12 is tightened against pole 200, thereby impeding slippage of bracket 12 with respect to the longitudinal axis of pole 200.

A support plate 34 is provided atop bracket 12. A teflon ring 36 is attached around the upper circumferential edge of plate 34 with a plurality of brass rivets to provide a bearing surface as hereinafter explained. A steel pivot pin 38 is rigidly attached to and protrudes upwardly from the centre of plate 34. The base of pin 38 is encircled by a second teflon bearing ring 40 which cooperates with bearing ring 36.

Figure 2:
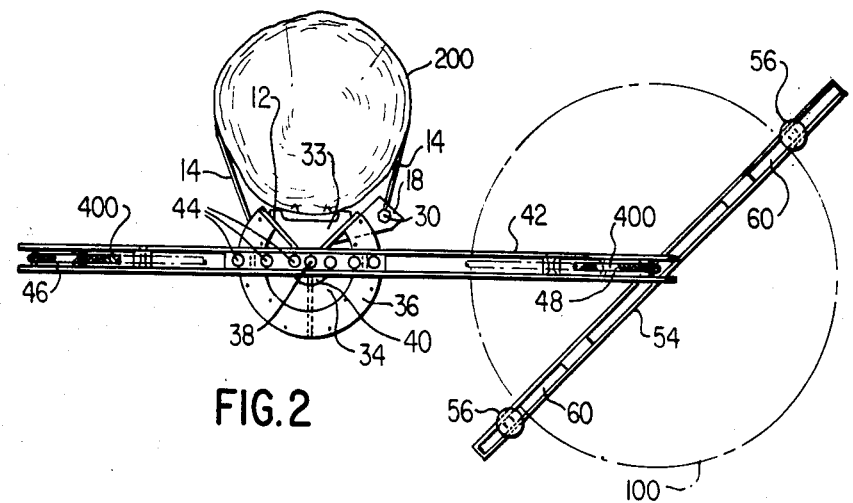
FIG. 2 is an enlarged top view of the apparatus depicted in FIG. 1 with the power lines and utility pole cross-arms removed to avoid obscuring details of the invention.
Figure 3:
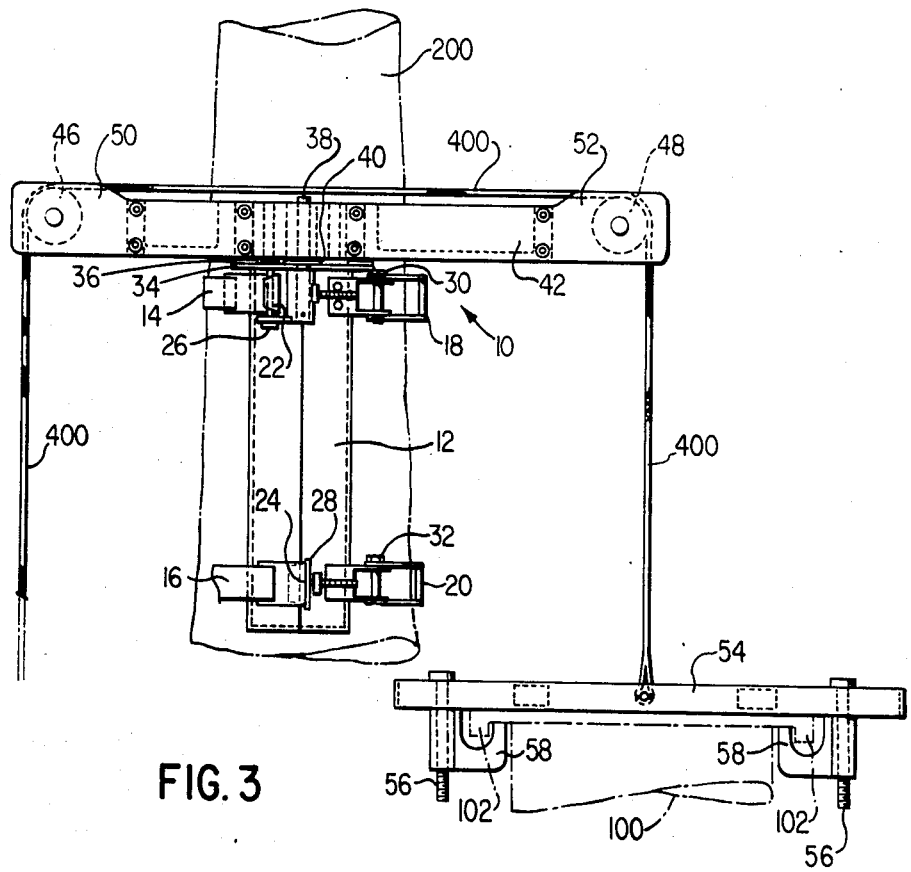
FIG. 3 is a front view of the apparatus depicted in FIG. 2.

An aluminum support beam 42 having a plurality of mounting holes 44 is pivotally mounted atop plate 34 by positioning one of holes 44 above pin 38 and then sliding beam 42 onto pin 38 until the base of beam 42 contacts teflon bearing rings 36, 40. A pair of sheaves 46, 48 are rotatably mounted in the opposed ends of beam 42 to guide load supporting line 400 as hereinafter explained. The ends 50, 52 of beam 42 are flared to prevent objects (such as the operator's fingers) being caught between line 400 and sheaves 46, 48. As may be seen in FIGS. 2 and 3, beam 42 extends transversely to the longitudinal axis of pole 200 and may pivot in a plane transverse to said axis.

A bar 54 is suspended (as hereinafter explained) from beam 42. "Engaging means" such as extended bolts 56 which threadably receive hook-shaped members 58 are provided at opposed ends of bar 54 for supportably engaging transformer 100. More particularly, hook-shaped members 58 engage support lugs 102 of transformer 100, thereby facilitating support of transformer 100 from bar 54. Bolts 56 pass through slots 60 cut in the opposed ends of bar 54. This enables slidable positioning of bolts 56 with respect to the ends of bar 54 so that members 58 may be positioned to accomodate transformers of varying widths. Once members 58 have been hooked onto transformer lugs 102 bolts 56 are tightened to draw bar 54 firmly against the top of transformer 100.

A lifting means such as a rope or line 400 (which could also be a cable or chain) is fastened to the central portion of bar 54 and suspended from beam 42 via sheaves 46, 48 which guide rope 400 to the side of pole 200 opposite to the side to which transformer 100 is mounted, thereby preventing interference of rope 400 with the hoisting operation. Rope 400 extends to the base of pole 200 where it may be attached to a power operated winch 500, electric capstan or the like for raising or lowering transformer 100 with respect to pole 200.

In operation, bracket 12 is strapped to pole 200 so that, when measured with respect to the longitudinal axis of pole 200, the vertical axis of bracket 12 is about sixty to ninety degrees away from the vertical axis of transformer 100 and so that support plate 34 is about five to six inches above the top of transformer 100. Beam 42 is then pivotally mounted on pin 38 from whichever of mounting holes 44 will enable beam end 52 to pivot over the centre of transformer 100. Rope 400 (which has previously been attached to the central portion of bar 54) is then guided over sheaves 46, 48 and bar 54 is placed on top of transformer 100. Bolts 56 are then slidably adjusted to position members 58 under transformer lugs 102 and bolts 56 are then tightened to draw bar 54 firmly against the top of transformer 100. The opposite end of rope 400 is then attached to a power operated winch at the base of pole 200. Winch 500 is then activated to raise or lower transformer 100 with respect to pole 200. Note that, while transformer 100 is suspended from beam 42 the beam may be rotated about pin 38 upon bearing rings 36, 40 in order to clear obstructions which may be encountered in raising or lowering transformer 100.

The entire operation may easily be accomplished by a single man. Note in particular that beam 42 may be mounted very close to the top of transformer 100 because very little clearance is required to affix bar 54 to the transformer, thereby maximizing the likelihood that gin 10 may be used without encroaching upon the limits of approach to the overhead power lines. More particularly, bar 54 may be raised closely proximate to (i.e. until it is almost touching) the base of beam 42.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A material hoisting gin, comprising:
   (a) a mounting bracket;
   (b) releasable attaching means for releasably attaching said bracket to an upright pole;
   (c) an unbraced support beam atop said bracket, said beam for extending transversely to the longitudinal axis of said pole;
   (d) a bar suspendable from said beam such that said bar may be raised to bring said bar closely proximate to the base of said beam;
   (e) engaging means on said bar for supportably engaging a load; and,
   (f) lifting means cooperating with said beam and bar for raising or lowering said load with respect to said pole;
   wherein:
   (g) said beam is pivotally mountable atop said bracket in any one of a range of positions, such that said beam may pivot in a plane transverse to the longitudinal axis of said pole, thereby facilitating selectable positioning of the ends of said beam with respect to said load and said pole; and,
   (h) said releasable attaching means comprises at least one strap for encircling said pole; and, ratchet means for tightening said strap around said pole.

2. A material hoisting gin, comprising:
   (a) a mounting bracket;
   (b) releasable attaching means for releasably attaching said bracket to an upright pole;
   (c) an unbracing support beam atop said bracket, said beam extending transversely to the longitudinal axis of said pole;
   (d) a bar suspendable from said beam such that said bar may be raised to bring said bar closely proximate to the base of said beam;
   (e) engaging means on said bar for supportably engaging a load; and,
   (f) lifting means cooperating with said beam and bar for raising or lowering said load with respect to said pole;

wherein said beam is pivotally mountable atop said bracket in any one of a range of positions, such that said beam may pivot in a plane transverse to the longitudinal axis of said pole, thereby facilitating selectable positioning of the ends of said beam with respect to said load and said pole; and, further comprising sheaves rotatably mounted in opposed ends of said beam for guiding a load support line affixed between said bar and said lifting means.

* * * * *